United States Patent
Beack et al.

(10) Patent No.: US 11,456,001 B2
(45) Date of Patent: Sep. 27, 2022

(54) METHOD OF ENCODING HIGH BAND OF AUDIO AND METHOD OF DECODING HIGH BAND OF AUDIO, AND ENCODER AND DECODER FOR PERFORMING THE METHODS

(71) Applicants: Electronics and Telecommunications Research Institute, Daejeon (KR); Kwangwoon University Industry-Academic Collaboration Foundation, Seoul (KR)

(72) Inventors: Seung Kwon Beack, Daejeon (KR); Jongmo Sung, Daejeon (KR); Mi Suk Lee, Daejeon (KR); Tae Jin Lee, Daejeon (KR); Hochong Park, Seongnam-si (KR)

(73) Assignees: Electronics and Telecommunications Research Institute, Daejeon (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 241 days.

(21) Appl. No.: 16/814,103

(22) Filed: Mar. 10, 2020

(65) Prior Publication Data
US 2021/0005209 A1    Jan. 7, 2021

(30) Foreign Application Priority Data
Jul. 2, 2019    (KR) .................. 10-2019-0079377

(51) Int. Cl.
*G10L 19/02*    (2013.01)
*G06N 3/04*    (2006.01)
(Continued)

(52) U.S. Cl.
CPC ........ *G10L 19/0204* (2013.01); *G06N 3/0454* (2013.01); *G10L 19/032* (2013.01); *G10L 21/038* (2013.01)

(58) Field of Classification Search
CPC . G10L 19/0204; G10L 21/038; G10L 19/032; G06N 3/0454
See application file for complete search history.

(56) References Cited

U.S. PATENT DOCUMENTS

2011/0119054 A1    5/2011    Lee et al.
2014/0310010 A1    10/2014    Seo et al.
(Continued)

FOREIGN PATENT DOCUMENTS

WO    WO 2015/162500 A2    10/2015

OTHER PUBLICATIONS

Lin Jiang; Ruimin Hu; Xiaochen Wang; Weiping Tu; Maosheng Zhang, "Nonlinear prediction with deep recurrent neural networks for non-blind audio bandwidth extension", Mar. 30, 2017.*

(Continued)

*Primary Examiner* — Jialong He
(74) *Attorney, Agent, or Firm* — NSIP Law (57) ABSTRACT

Disclosed are a method of encoding a high band of an audio, a method of decoding a high band of an audio, and an encoder and a decoder for performing the methods. The method of decoding a high band of an audio, the method performed by a decoder, includes identifying a parameter extracted through a first neural network, identifying side information extracted through a second neural network, and restoring a high band of an audio by applying the parameter and the side information to a third neural network.

14 Claims, 11 Drawing Sheets

(51) Int. Cl.
  *G10L 21/038* (2013.01)
  *G10L 19/032* (2013.01)

(56) References Cited

U.S. PATENT DOCUMENTS

| | | |
|---|---|---|
| 2016/0225379 A1 | 8/2016 | Sung |
| 2018/0130478 A1 | 5/2018 | Beack et al. |
| 2020/0243102 A1* | 7/2020 | Schmidt et al. ........ G10L 21/02 704/2 |

OTHER PUBLICATIONS

Mahmood Yousefi-Azar, Farbod Razzazi, "A Robust Frame-based Nonlinear Prediction System for Automatic Speech Coding", Jan. 22, 2016.*

Jun Deng, Björn Schuller, Florian Eyben, Dagmar Schuller, Zixing Zhang, Holly Francois & Eunmi Oh, "Exploiting time-frequency patterns with LSTM-RNNs for low-bitrate audio restoration", May 10, 2019.*

Cho, Hyo-Jin, et al. "Audio High-Band Coding based on Autoencoder with Side Information." Journal of Broadcast Engineering 24.3 (May 2019): 387-394. (Year: 2019).*

Shin, Seong-Hyeon, et al. "Audio coding based on spectral recovery by convolutional neural network." ICASSP 2019-2019 IEEE International Conference on Acoustics, Speech and Signal Processing (ICASSP). IEEE, May 2019. (Year: 2019).*

Dietz, Martin et al., "Spectral Band Replication, a Novel Approach in Audio Coding", 112*th AES Convention*, Munich, Germany, May 10-13, 2002 (pp. 1-8).

\* cited by examiner

Encoding network for high band

| layer | function | output dim. |
|---|---|---|
| in | high-band MDCT coeff. | 192 |
| 1 | FCN GLU | 96 |
| 2 | FCN GLU | 24 |
| 3 | FCN sigmoid | 4 |
| out | latent vector | 4 |

FIG. 8B

Encoding network for side information

| layer | function | output dim. | filters | kernel | stride |
|---|---|---|---|---|---|
| in | side-info. MDCT coeff. | 8×256 | | | |
| 1 | 2D CNN GLU | 4×128×32 | 32 | [5,5] | [2,2] |
| 2 | 2D CNN GLU | 2×64×64 | 64 | [5,5] | [2,2] |
| 3 | 2D CNN GLU | 1×32×128 | 128 | [5,5] | [2,2] |
| 4 | flatten, FCN sigmoid | 10 | — | — | — |
| out | latent vector | 10 | | | |

FIG. 9

Decoding network

| layer | function | output dim. |
|---|---|---|
| in | latent vector | 14 |
| 1 | FCN GLU | 32 |
| 2 | FCN GLU | 96 |
| 3 | FCN sigmoid | 192 |
| out | high-band MDCT coeff. | 192 |

FIG. 10

METHOD OF ENCODING HIGH BAND OF AUDIO AND METHOD OF DECODING HIGH BAND OF AUDIO, AND ENCODER AND DECODER FOR PERFORMING THE METHODS

CROSS-REFERENCE TO RELATED APPLICATION(S)

This application claims the benefit of Korean Patent Application No. 10-2019-0079377, filed on Jul. 2, 2019, in the Korean Intellectual Property Office, the disclosure of which is incorporated herein by reference.

BACKGROUND

1. Field of the Invention

One or more example embodiments relate to a method of restoring a high band of an audio through neural networks.

2. Description of the Related Art

In the past, parametric encoding was developed to represent and encode audio information in a parameter domain. Parametric encoding represents and transmits audio information to be transmitted from an encoder to a decoder in the form of a few parameters, and thus may reduce a bit rate. However, parametric encoding has difficulties in processing high-quality encoding due to a great loss of the original audio information.

Thus, for audio encoding, a method of transmitting a low band of an audio having great influence on the sound quality using transform encoding, and transmitting a high band of the audio with relatively low auditory significance using parametric encoding has been widely used. Representatively, spectral band replication (SBR) has been used for parametric encoding with respect to a high band of an audio.

When an audio is encoded using SBR, an operation domain of the low band to which transform encoding is applied differs from a QMF domain of the high band, and thus a computational complexity may increase to perform two types of transforms during the encoding process. Accordingly, there is a desire for a scheme of restoring high-quality high band information while reducing a computational complexity in the existing parametric encoding.

SUMMARY

An aspect provides a method and apparatus that may optimally encode a high band of an audio using respective neural networks for a process of extracting a parameter to restore the high band, a process of extracting side information, and a process of restoring the high band using the parameter and the side information.

Another aspect also provides a method and apparatus that may not use a bit required for transmitting a parameter by determining the parameter required for restoring a high band directly by a decoder, thereby increasing the coding efficiency.

According to an aspect, there is provided a method of decoding a high band of an audio, the method performed by a decoder, the method including identifying a parameter extracted through a first neural network, identifying side information extracted through a second neural network, and restoring a high band of an audio by applying the parameter and the side information to a third neural network.

The first neural network may be configured to extract the parameter of the high band from a first input based on a per-frame spectrum of the audio.

The first input may be determined to be a subset of a spectrum, and the spectrum may include a high-band coefficient and a low-band coefficient of a previous frame, and a high-band coefficient and a low-band coefficient of a current frame.

The second neural network may be configured to extract the side information to restore the high band from a second input based on a per-frame spectrum of the audio.

The second input may be determined to be a subset of a spectrum, and the spectrum may include a high-band coefficient and a low-band coefficient of a previous frame, and a low-band coefficient of a current frame.

When a decoding frame of the audio is a current frame, a first input applied to the first neural network may include a high-band coefficient of the current frame, and a second input applied to the second neural network may include a low-band coefficient of the current frame.

When a decoding frame of the audio is a current frame and there is at least one previous frame with respect to the current frame, a first input applied to the first neural network may include a high-band coefficient of the current frame, and a second input applied to the second neural network may include a high-band coefficient and a low-band coefficient of the previous frame, and a low-band coefficient of the current frame.

When a decoding frame of the audio is a previous frame and there is at least one previous frame with respect to a current frame, a first input applied to the first neural network may include a high-band coefficient of the current frame and a high-band coefficient of the previous frame, and a second input applied to the second neural network may include a low-band coefficient of the previous frame.

The identifying of the parameter may include identifying the parameter by dequantizing a quantized parameter received from an encoder.

The identifying of the parameter may include identifying the extracted parameter by randomly sampling an output of the first neural network.

The restoring may include using a high band of the current frame and a high band of at least one previous frame of the current frame.

According to another aspect, there is provided a method of encoding a high band of an audio, the method performed by an encoder, the method including extracting a parameter extracted through a first neural network, and quantizing the extracted parameter, wherein the parameter may be transmitted to a decoder, input into a third neural network together with side information extracted through a second neural network, and used to restore a high band of an audio.

According to another aspect, there is provided a decoder including a processor, wherein the processor may be configured to identify a parameter extracted through a first neural network, identify side information extracted through a second neural network, and restore a high band of an audio by applying the parameter and the side information to a third neural network.

The first neural network may be configured to extract the parameter of the high band from a first input based on a per-frame spectrum of the audio.

The first input may be determined to be a subset of a spectrum, and the spectrum may include a high-band coefficient and a low-band coefficient of a previous frame, and a high-band coefficient and a low-band coefficient of a current frame.

The second neural network may be configured to extract the side information to restore the high band from a second input based on a per-frame spectrum of the audio.

The second input may be determined to be a subset of a spectrum, and the spectrum may include a high-band coefficient and a low-band coefficient of a previous frame, and a low-band coefficient of a current frame.

According to another aspect, there is provided an encoder configured to extract a parameter extracted through a first neural network, and quantize the extracted parameter, wherein the parameter may be transmitted to a decoder, input into a third neural network together with side information extracted through a second neural network, and used to restore a high band of an audio.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings.

Figure 1:
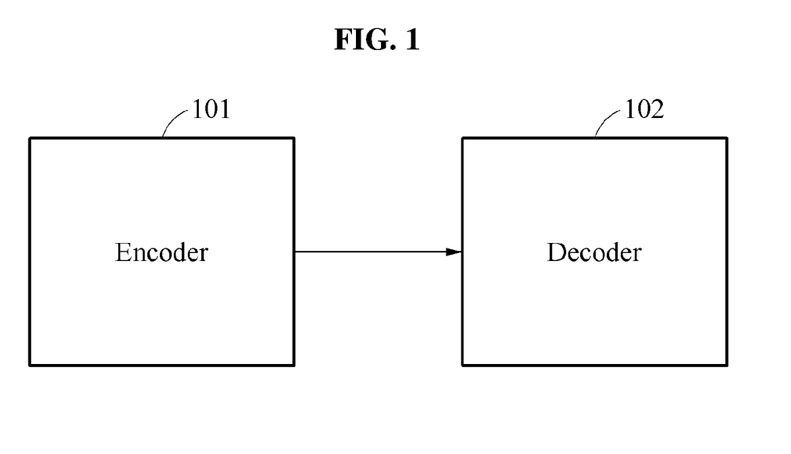
FIG. 1 is a diagram illustrating an encoder and a decoder according to an example embodiment.

FIG. 1 is a diagram illustrating an encoder and a decoder according to an example embodiment.

Example embodiments propose a method of encoding and decoding a high band of an audio. In detail, an encoder 101 may extract a parameter to restore a high band of an audio, quantize the parameter, and transmit the parameter to a decoder 102 in the form of a digital bit. The decoder 102 may restore the high band of the audio using the parameter received from the encoder 101 and side information separately extracted.

In another example, the parameter to restore the high band of the audio may be extracted directly by the decoder 102, rather than determined by the encoder 101.

In this example, the side information may be extracted from a low band of a previous frame, a high band of the previous frame, and a low band of a current frame. The parameter with respect to the high band may be extracted using a neural network, the side information may be extracted using an neural network, and the high band of the audio may be restored from the parameter and the side information using an neural network. The neural network used to extract the parameter, the neural network used to extract the side information, and the neural network used to restore the high band may be independent neural networks.

A process of encoding an audio may be performed on a frame-by-frame basis, wherein a frame is defined as a predetermined time period. That is, the encoder 101 may input an audio of the current frame, and extract and transmit a parameter of an encoding frame to be encoded. The encoding frame may be the current frame or the previous frame.

A method of encoding the high band by utilizing the parameter of the high band will be described below from a different point of view.

The decoder 102 may perform a first process of primarily restoring the high band from the side information, and a second process of restoring a final high band by applying the parameter received from the encoder 101 to the primarily-restored high band. The encoder 101 may expect the first process and the second process performed by the decoder 102, and perform a third process of calculating the parameter of the high band to minimize a loss of information of the high band. When the first process, the second process, and the third process are integrally optimized, the performance of encoding the high band may improve.

A temporal position of a frame for encoding may be the same as that of the current frame, or earlier than that of the current frame. If a frame to be encoded is a previous frame of the current frame, encoding may be performed by referring to a subsequent frame of the current frame being encoded.

The decoder 102 may output an audio of a single frame. Due to a time delay occurring during operations of the encoder 101 and the decoder 102, an output signal of the decoder 102 may be a previous frame of the current frame being encoded.

Figure 2:
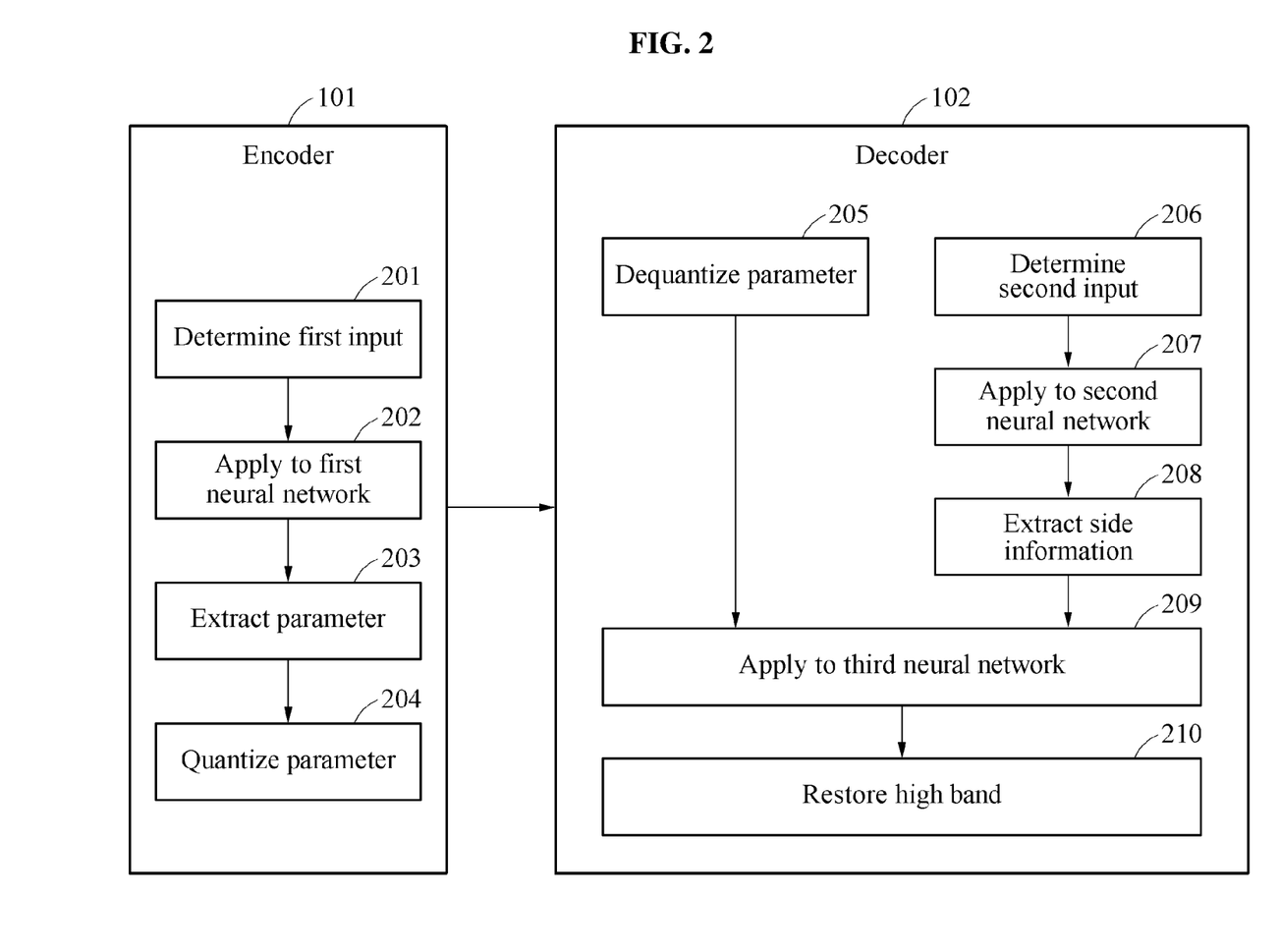
FIG. 2 is a diagram illustrating operations of an encoder and a decoder according to an example embodiment.

FIG. 2 is a diagram illustrating operations of an encoder and a decoder according to an example embodiment.

Referring to FIG. 2, the encoder 101 may output a parameter from a current frame which is an input signal, and transmit a result of quantizing and encoding the parameter (a bitstream) to the decoder 102.

The decoder 102 may output the parameter from the bitstream received from the current frame, and separately extract side information. The decoder 102 may determine an output signal of a high band using the parameter and the side information.

Due to a time delay occurring during operations of the encoder 101 and the decoder 102, a frame corresponding to the output signal may not be the current frame. Thus, the process of extracting the side information with respect to the current frame may be performed by the decoder 102 using low band information and the output signal derived from a previous frame.

The process of extracting the parameter, the process of extracting the side information, and the process of restoring the high band may be implemented through independent neural networks. For example, an neural network may have a structure of a convolutional neural network (CNN). The structure and the size of the neural network may be predetermined.

Referring to FIG. 2, in operation 201, the encoder 101 may determine a first input including high band information of an audio to be encoded. In operation 202, the encoder 101 may apply the first input to a first neural network. In operation 203, the encoder 101 may extract a parameter of a high band. In operation 204, the encoder 101 may compress the extracted parameter by quantizing the parameter.

In operation 205, the decoder 102 may dequantize the quantized parameter. Meanwhile, in operation 206, the decoder 102 may determine a second input. In operation 207, the decoder 102 may apply the second input to a second neural network. In operation 208, the decoder 102 may extract side information.

In operation 209, the decoder 102 may apply the side information and the parameter extracted by the encoder 101 to a third neural network. In operation 210, the decoder 102 may restore the high band of the audio.

According to example embodiments, it is possible to extract optimal side information for high band restoration by modeling an audio using a neural network, and extract an optimal parameter to restore a final high band signal using a separate neural network through combination with the side information. Further, it is possible to restore final high band information of the audio from the side information and the parameter using a separate neural network.

Meanwhile, a method of quantizing the parameter directly by the encoder 101 and transmitting the quantized parameter to the decoder 102 may be applied. In another example, the high band may be restored by determining the parameter for the high band directly by the decoder 102, rather than compressing and transmitting the parameter by modeling statistics of the parameter (that is, without using an encoding bit).

According to example embodiments, three neural networks, that is, a first neural network, a second neural network, and a third neural network, may be applied. The first neural network may be applied to a process of extracting a parameter for restoring a high band, the second neural network may be applied to a process of extracting side information, and the third neural network may be applied to a process of restoring the high band using the parameter and the side information. The first neural network, the second neural network, and the third neural network may be trained integrally and concurrently, whereby the encoding performance may improve.

Figure 4:
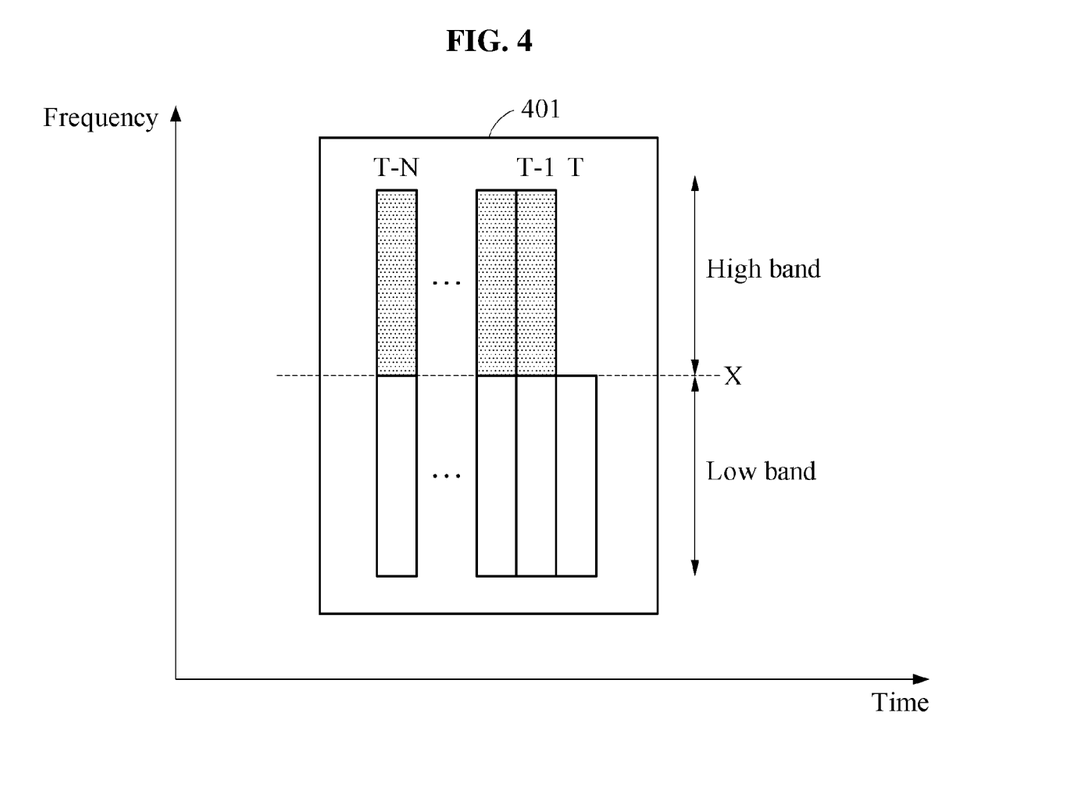
FIG. 4 illustrates an example of a second input according to an example embodiment.

Referring to FIG. 4, the first neural network may output a parameter using a first input. The second neural network may output side information using a second input. The third neural network may restore an audio of a high band using the parameter and the side information.

A frame corresponding to the high band of the audio may include an encoding frame. The frame corresponding to the high band should be included in a frame of the first input. If a restored high band of an audio includes only the encoding frame, the size of a matrix to be applied to a neural network may be H×1. If a high band of an audio is determined for each of a plurality of frames, the decoder 102 may restore the high band for each frame. An output result of the decoder 102 with respect to a predetermined frame may be utilized later for a process of processing a subsequent frame.

The training objective of the first neural network, the second neural network, and the third neural network described with reference to FIG. 2 may be to match the high band of the audio derived through the decoder 102 to the first input. Thus, it is needed to minimize a difference between the high band of the audio restored through the decoder 102 and the first input. To optimize the performance of quantizing the parameter during training of the neural network, an entropy of the parameter may be set as an error required for training. A CNN may be applied to the first neural network, the second neural network, and the third neural network described with reference to FIG. 2.

Meanwhile, when an output of the first neural network is set as a mean and a variance of a Gaussian random variable, the first neural network may sample and output a random variable with statistical characteristics such as the set mean and the set variance as the parameter. When training is performed in a VAE structure, the parameter may be output from the decoder 102 by sampling the Gaussian random variable randomly, rather than quantized and transmitted to the decoder 102 by the encoder 101. In this example, the encoder 101 may not need to extract the parameter, quantize the parameter, and transmit the parameter to the decoder 102 in the form of a bit. Thus, a process of encoding a high band using a zero bit may be implemented. Accordingly, the operation of the encoder 101 of FIG. 2 may be performed by the decoder 102. In this example, the process of quantizing and dequantizing the parameter as in operations 204 and 205 may be omitted.

That is, the process of FIG. 2 may be a process of extracting and quantizing a parameter by the encoder 101 to restore a high band according to a first example embodiment. However, in a second example embodiment, the parameter may be output directly from the decoder 102, rather than extracted and transmitted to the decoder 102 through the bit by the encoder 101.

According to the first example embodiment, a low band of the audio restored from the current frame and the previous frame and a high band of the audio corresponding to the previous frame output before the high band with respect to the current frame is restored may be used to determine the second input.

The decoder 102 may restore the high band of the audio corresponding to the current frame using the parameter and the side information. The decoder 102 may restore a high band corresponding to a single frame, or combine high bands corresponding to the previous frame and the current frame.

Figure 3:
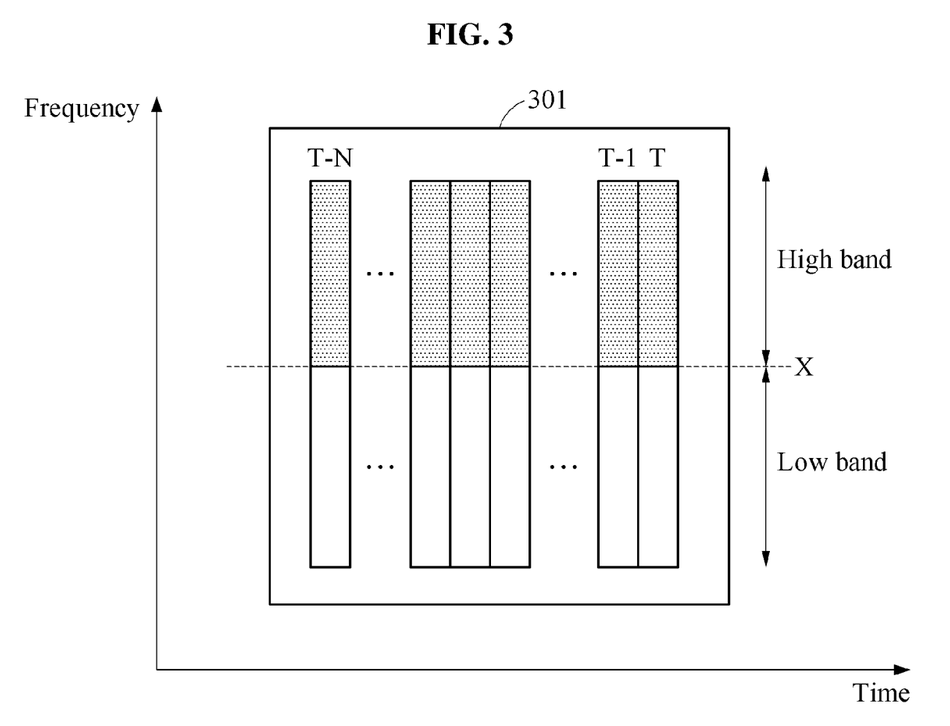
FIG. 3 illustrates an example of a first input according to an example embodiment.

FIG. 3 illustrates an example of a first input according to an example embodiment.

In FIG. 3, a two-dimensional (2D) spectrum determined based on a time and a frequency is illustrated. The encoder 101 may derive a spectrum of an audio for each frame. For example, the spectrum may be defined as a Fourier transform coefficient, an MDCT coefficient, a transform coefficient of other signals, or the size of a transform coefficient.

Referring to FIG. 3, the 2D spectrum may be defined by sequentially listing spectrums corresponding to frames from T–N to T. Here, a frame corresponding to T may be a current frame, and frames corresponding to T–1 through T–N may be previous frames.

Further, a spectrum of each frame may be separated into spectrum coefficients of transform coding corresponding to a low band and a high band based on X, according to predetermined high band encoding standards. In this example, when the number of spectrum coefficients corresponding to the low band is defined as L, and the number of spectrum coefficients corresponding to the high band is defined as H, the first input may include the current frame and the previous frame, and be represented as an (L+H)*N-dimensional matrix.

A frame to which actual encoding is to be applied with respect to the encoder 101 of the current frame may be defined as an encoding frame. The encoding frame may be a previous frame which is already encoded, or a current frame being encoded. A high band of the encoding frame may be represented as an H×1-dimensional matrix.

A first input to be used to extract a parameter needed to restore the high band may be defined in a spectrum 301 defined in FIG. 3. The first input may correspond to a subset of the spectrum 301. The first input 203 to be used for extraction may be defined. In detail, the size of the first input may be predetermined, and include the high band of the encoding frame.

FIG. 4 illustrates an example of a second input according to an example embodiment.

A second input may be used by the decoder 102 to extract side information. The second input may be determined in a spectrum 401. The spectrum 401 may be the same as the spectrum 301.

The spectrum 401 may include a high band of an audio output from a previous frame and low bands of a current frame and the previous frame. In this example, the spectrum 401 may not include a high band of the current frame. The second input may be a subset of the spectrum 401, and may be defined in a predetermined size. As shown in FIGS. 3 and 4, frame regions in which the first input and the second input are determined may be overlapping regions.

Figure 5:
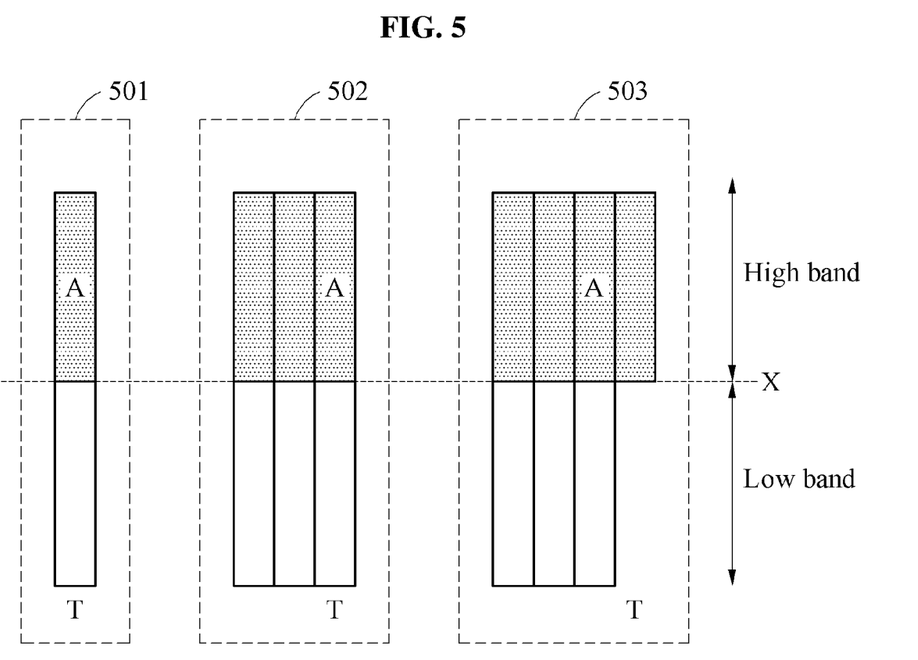
FIG. 5 illustrates a result of comparing a first input and a second input according to an example embodiment.

FIG. 5 illustrates a result of comparing a first input and a second input according to an example embodiment.

A case 501 is an example in which a current frame and an encoding frame A match. In this example, a first input may be the same as a high band of the current frame T, and the encoder 101 may use only the current frame. A second input may be the same as a restored low band of the current frame.

A case 502 is an example in which a current frame T and an encoding frame A match. In this example, a first input may be the same as a high band of the current frame, and a second input may be the same as a high band and a low band of a previous frame, and a low band of the current frame.

A case 503 is an example in which an encoding frame A is a previous frame T−1. In this example, a first input may be high bands of a current frame T and previous frames T−1 through T−3, and a second input may be low bands of the previous frames T−1 through T−3.

Figure 6A:
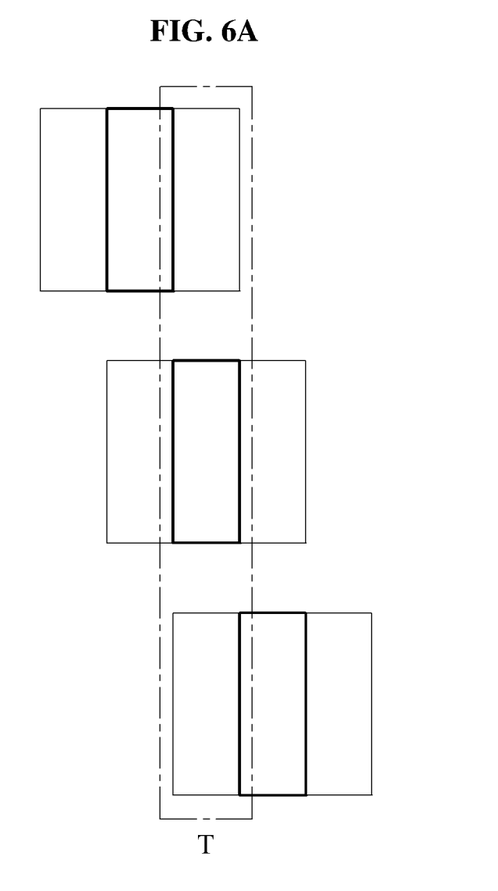
FIGS. 6A and 6B illustrate examples of outputting a high band of an audio according to an example embodiment.
Figure 6B:
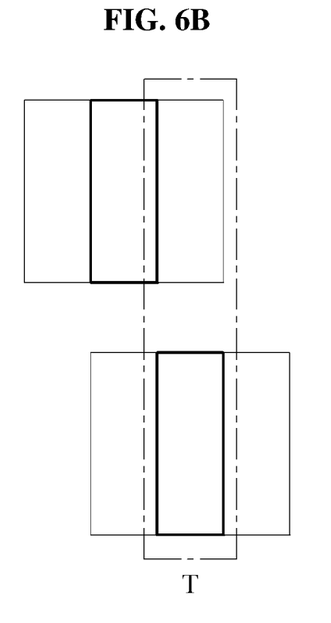

FIGS. 6A and 6B illustrate examples of outputting a high band of an audio according to an example embodiment.

Referring to FIGS. 6A and 6B, an example of outputting a restored high band of an audio by weighted-averaging the current frame T and two previous frames T−1 and T−2, and an example of outputting a restored high band of an audio using a current frame T and a previous frame T−1 are illustrated.

Figure 7:
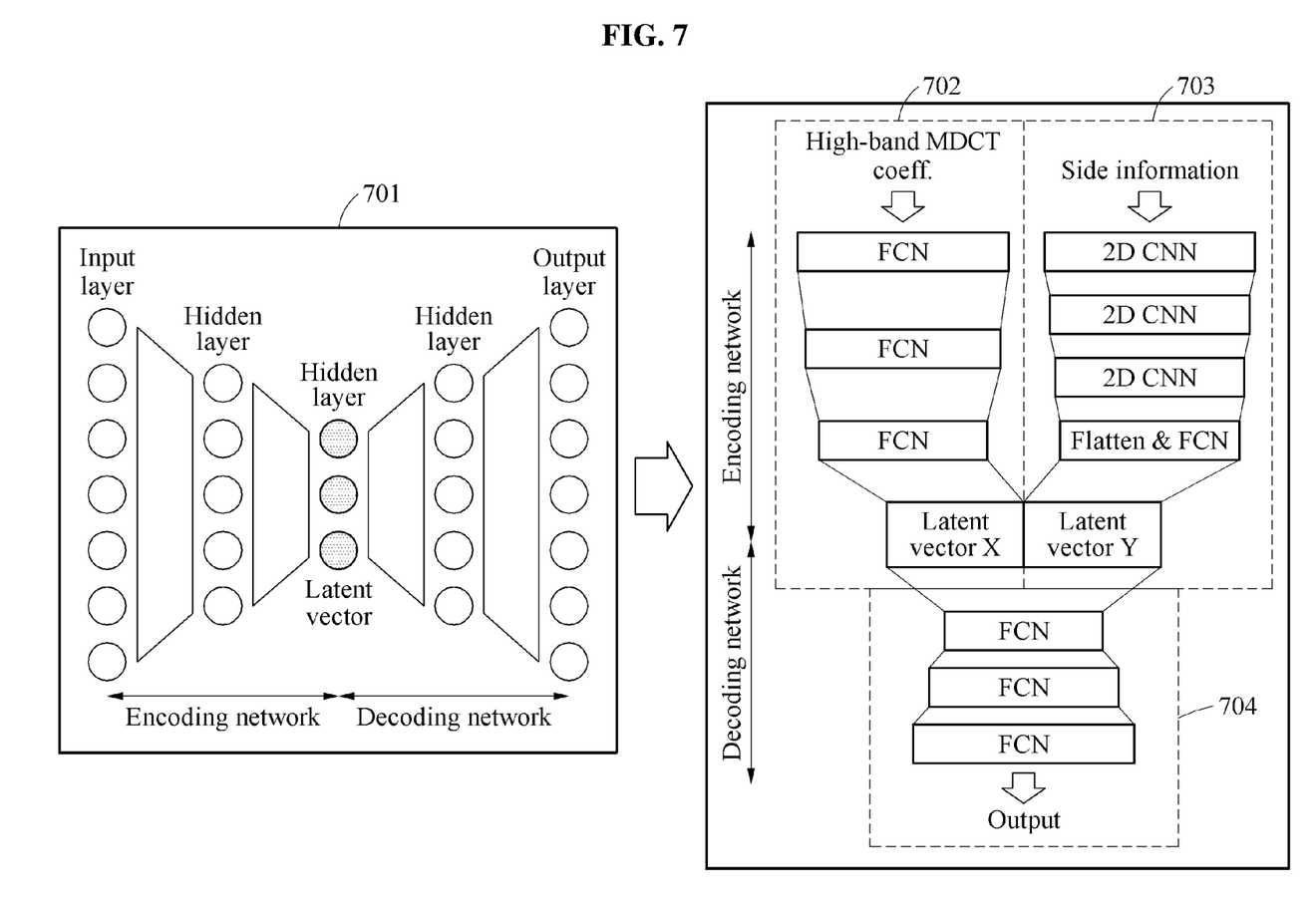
FIG. 7 illustrates a structure of an autoencoder according to an example embodiment.

FIG. 7 illustrates a structure of an autoencoder according to an example embodiment.

Example embodiments propose a new method of high band parametric encoding using an autoencoder 701. In this example, the autoencoder 701 may input side information including a low band of a previous frame and a low band of a current frame, thereby improving the performance of restoring a high band. Further, since the side information based on a 2D spectrum configured with respect to a time and a frequency is used to restore the high band, time characteristics may be utilized to restore the high band.

For example, a process of restoring the high band may be performed in a modified discrete cosine transform (MDCT) domain. A computational complexity may be reduced by removing QMF computation required by SBR, and both a low band and a high band may be performed in the MDCT domain.

When a dimension of a hidden layer is set to be much smaller than a dimension of an input layer in the autoencoder 701 of FIG. 7, and the input layer and the output layer are trained to be the same, the autoencoder 701 may compress and represent input information as fewer data of the corresponding hidden layer.

In the autoencoder 701, a value of the hidden layer compressing and representing the input information may be defined as a latent vector. The autoencoder 701 may restore the input signal from the latent vector through a decoding network. That is, an encoding operation may correspond to a process of obtaining a latent vector with respect to an input signal using an encoding network of an autoencoder, and a decoding operation may correspond to a process of restoring the original signal from the latent vector using a decoding network.

The encoder 101 may operate on a frame-by-frame basis, wherein a frame is 1024 samples long. The encoder 101 may apply a 2048-sample-long window with 50% overlap and obtain 1024 MDCT coefficients for each frame by calculate MDCT. For example, when a total bandwidth to which encoding is applied is set to 14.25 kHz, 9.75 to 14.25 kHz may be defined as a high band. In this example, a sampling frequency may be 48 kHz, a single frame may have a total of 608 MDCT coefficients, and the high band may include 192 MDCT coefficients. Here, the MDCT coefficients may be parameters to be used for restoring the high band.

Referring to FIG. 7, an overall structure of an autoencoder is proposed. In particular, the autoencoder may additionally use side information, and thus encoding networks 702 and 703 may exist in parallel. 192 high-band MDCT coefficients corresponding to information to be encoded may be input into the first encoding network 702, and transformed into a four-dimensional (4D) latent vector X through a total of three-layered fully-connected networks (FCNs).

In addition, the side information may include MDCT coefficients of a 3.75 to 9.75-kHz domain corresponding to low bands of a current frame and seven previous frames. That is, the side information may be 2D data with 8×256 structure. In this example, information lower than or equal to 3.75 kHz may have a low correlation with the high band, and thus may not be used as the side information. By utilizing the previous frames as the side information, temporal change information of a signal may be utilized to restore the high band, whereby the restoring performance of the autoencoder may improve.

The side information may be input into the second encoding network 703, and transformed to a 10-dimensional latent vector Y through a total of three-layered 2D CNNs and a one-dimensional flatten and FCN. When the 2D CNNs are used, frequency characteristics and time characteristics of the side information may be utilized. A 14-dimensional latent vector may be obtained by combining the two types of the latent vectors X and Y obtained as described above, and final output data may be determined by inputting the 14-dimensional latent vector into a decoding network.

In this example, when the latent vector Y is used as is without compressing the side information, a quantity of side information may be overly great. In this example, the decoding network may restore the high band more based on the side information than the input information to be restored, whereby the performance of restoring the high band may decrease. Further, when the side information is compressed into overly little data, information to be utilized to restore the high band may lack, and thus the performance improvement may be restricted. The example embodiments propose compressing the side information into a predetermined quantity of data.

Autoencoder training of FIG. 7 may be performed as follows.

192 MDCT coefficients corresponding to a high band extracted from training data may be input into the encoding network 702, and 8×256-dimensional side information may be generated by the encoding network 703 and input into respective encoding networks. Then, a final output of a decoding network 704 may be 192 items of data.

To minimize errors between the MDCT coefficients corresponding to the high band and the output of the decoding network 704, the encoding network 702, the encoding network 703, and the decoding network 704 may need to be trained at the same time. When training the neural networks, a latent vector X and side information not quantized may be used.

According to example embodiments, the size of MDCT coefficients may be input into an autoencoder to restore the size of MDCT coefficients, and a sign of the MDCT coefficients may be separately processed. Since the size of MDCT coefficients for each frame of an audio signal may greatly differ, and thus the MDCT size may be normalized and input into a neural network. In detail, the size of MDCT coefficients may be normalized between "0" and "1", and input into the autoencoder for training. Here, normalization may be performed such that a sum of sizes of high-band MDCT coefficients and a sum of sizes of low-band MDCT coefficients with respect to respective frames may each be "1". Through such per-frame normalization, a change in the performance of the autoencoder resulting from a difference in frame energy may be reduced.

To restore a normalization, a sum of sizes of MDCT coefficients of a high band used for the normalization may be defined as a gain variable G, and the gain variable G may be quantized and transmitted to a decoder. The decoder may derive the final MDCT coefficient size by multiplying the received G to the MDCT coefficient size output from the autoencoder.

According to an example embodiment, a process of training the autoencoder of FIG. 7 is performed using the normalized MDCT coefficient size. Encoding of the high band of the audio is performed using the trained autoencoder.

First, 192 MDCT coefficients of a high band to be encoded are obtained and normalized from an input audio, and the gain variable G is obtained, quantized to 4 bits, and transmitted. Next, a 4D vector X is obtained by inputting the 192 normalized MDCT coefficient sizes into an encoding network, quantized to an 8-bit vector, and transmitted. That is, a total of 5 items of data are transmitted from the encoder to the decoder, and there are 12 quantization bits. Thus, an encoding bit rate of the high band may be 0.56 kbps.

A process of decoding a high band is performed as follows. A 10-dimensional vector Y may be derived by obtaining the MDCT coefficient size of a low band with respect to a current frame and 7 previous frames, normalizing, and inputting the same into the encoding network. A 14-dimensional vector may be obtained by combining the vector Y and the 4D vector X received from the encoder, and an output signal may be derived by inputting the 14-dimensional vector into a decoding network. Then, the MDCT coefficient size of the high band is obtained by multiplying the output by the gain variable G received from the encoder. Last, similar to intelligent gap filling (IGF), a final MDCT coefficient of a high band may be derived by applying an MDCT coefficient sign of the low band to the MDCT coefficient size of the high band. By copying the sign of the MDCT coefficient, a sign connection pattern of a neighboring MDCT coefficient may be recycled. According to the above method, the performance of restoring a high band may improve, when compared to an example of assigning an MDCT sign at random.

Example embodiments propose a method of encoding a high band of an audio using an autoencoder which uses side information. By additionally inputting side information including current information and previous information as well as information to be encoded, it is possible to utilize the previous information and low band information at the same time. Further, by converting the side information into compressed data through an encoding network and inputting the data into a decoding network, the performance of restoring a high band may improve.

Figure 8A:
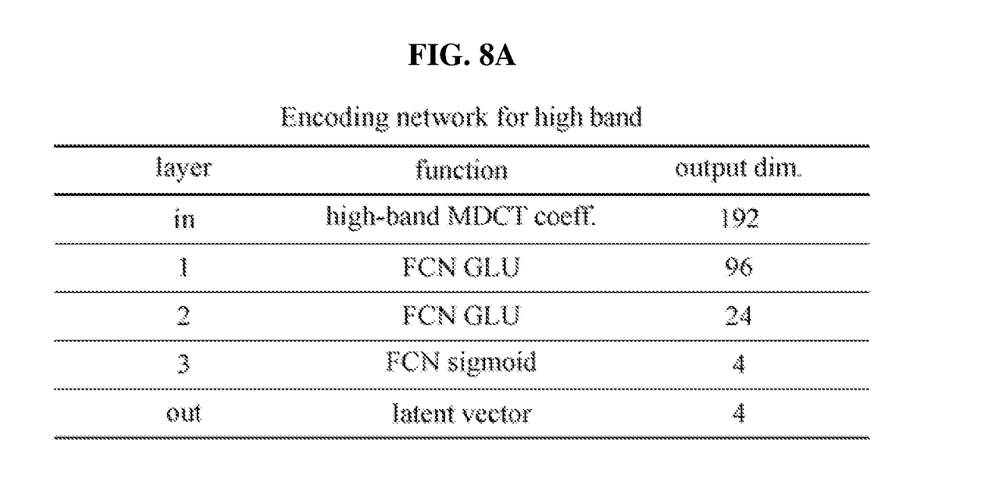
FIGS. 8A and 8B illustrate examples of structures of an encoding network in an autoencoder according to an example embodiment.
Figure 8B:
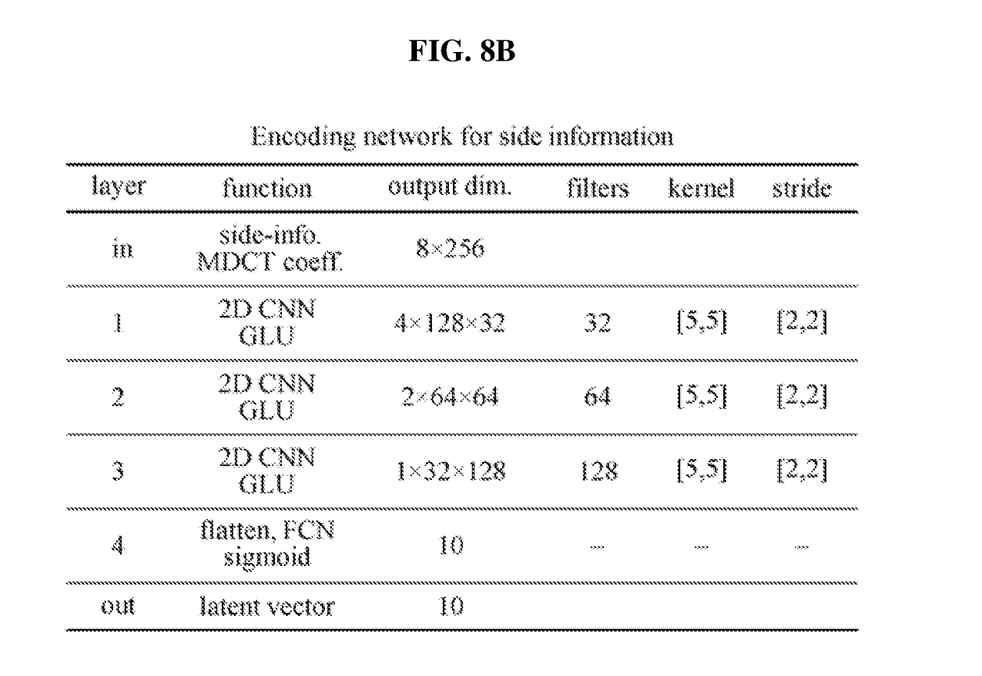

FIGS. 8A and 8B illustrate structure examples of an encoding network in an autoencoder according to an example embodiment.

Figure 9:
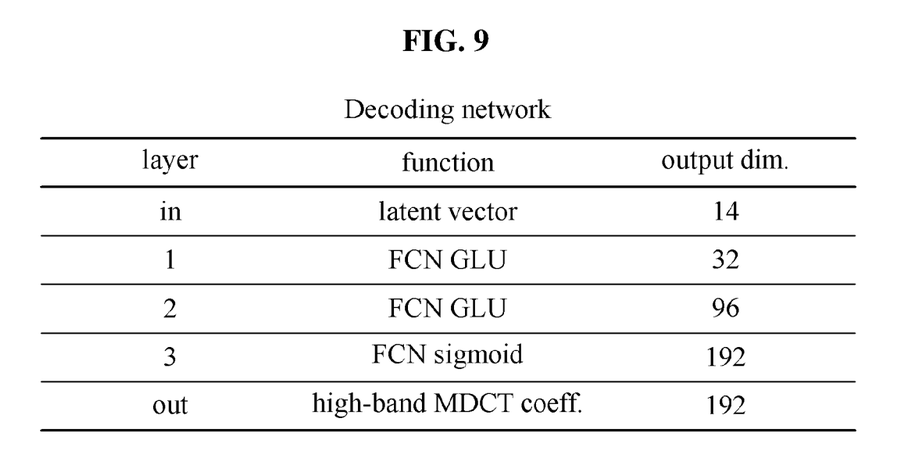
FIG. 9 illustrates an example of a structure of a decoding network in an autoencoder according to an example embodiment.

FIG. 9 illustrates a structure example of a decoding network in an autoencoder according to an example embodiment.

Figure 10:
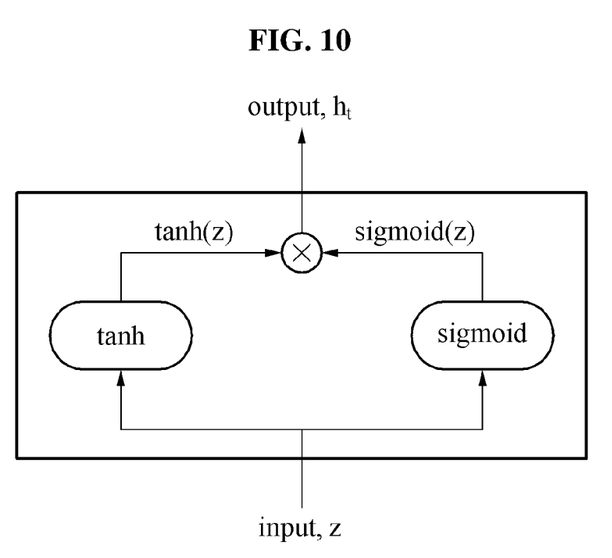
FIG. 10 is a diagram illustrating an example of a hidden layer and an output layer in output layers of an encoding network and a decoding network in an autoencoder according to an example embodiment.

FIG. 10 is a diagram illustrating an example of a hidden layer and an output layer in output layers of an encoding network and a decoding network in an autoencoder according to an example embodiment.

A sigmoid function may be used as an activation function with respect to the output layers of the encoding networks 702 and 703 and the decoding network of FIG. 7, and a gated linear unit (GLU) function may be used as an activation function with respect to the hidden layers thereof. Referring to FIG. 7, z denoting a result of adding a bias b to a product of an output $h_{t-1}$ of a previous layer and a weight W may be derived. In addition, by applying tan h and sigmoid functions to z, a GLU output $h_t$ of a current layer may be derived. When a GLU is used, a ratio of a tan h output to be transmitted to a subsequent layer may be adjusted through an output of the sigmoid function, whereby operations of various neural networks may be performed.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of decoding a high band of an audio, the method performed by a decoder, the method comprising:
   identifying a parameter extracted through a first neural network;
   identifying side information extracted through a second neural network; and
   restoring a high band of an audio by applying the parameter and the side information to a third neural network,
   wherein, when a decoding frame of the audio is a current frame and there is at least one previous frame with respect to the current frame, a first input applied to the first neural network includes a high-band coefficient of the current frame, and a second input applied to the second neural network includes a high-band coefficient and a low-band coefficient of the previous frame, and a low-band coefficient of the current frame.

2. The method of claim 1, wherein the first neural network is configured to extract the parameter of the high band from a first input based on a per-frame spectrum of the audio.

3. The method of claim 2, wherein the first input is determined to be a subset of a spectrum, and
   the spectrum includes a high-band coefficient and a low-band coefficient of a previous frame, and a high-band coefficient and a low-band coefficient of a current frame.

4. The method of claim 1, wherein the second neural network is configured to extract the side information to restore the high band from a second input based on a per-frame spectrum of the audio.

5. The method of claim 4, wherein the second input is determined to be a subset of a spectrum, and
   the spectrum includes a high-band coefficient and a low-band coefficient of a previous frame, and a low-band coefficient of a current frame.

6. The method of claim 1, wherein, when a decoding frame of the audio is a current frame, a first input applied to the first neural network includes a high-band coefficient of the current frame, and a second input applied to the second neural network includes a low-band coefficient of the current frame.

7. The method of claim 1, wherein, when a decoding frame of the audio is a previous frame and there is at least one previous frame with respect to a current frame, a first input applied to the first neural network includes a high-band coefficient of the current frame and a high-band coefficient of the previous frame, and a second input applied to the second neural network includes a low-band coefficient of the previous frame.

8. The method of claim 1, wherein the identifying of the parameter comprises identifying the parameter by dequantizing a quantized parameter received from an encoder.

9. The method of claim 1, wherein the identifying of the parameter comprises identifying the extracted parameter by randomly sampling an output of the first neural network.

10. The method of claim 1, wherein the restoring comprises using a high band of the current frame and a high band of at least one previous frame of the current frame.

11. A decoder, comprising:
    a processor,
    wherein the processor is configured to identify a parameter extracted through a first neural network, identify side information extracted through a second neural network, and restore a high band of an audio by applying the parameter and the side information to a third neural network, and wherein, when a decoding frame of the audio is a current frame and there is at least one previous frame with respect to the current frame, a first input applied to the first neural network includes a high-band coefficient of the current frame, and a second input applied to the second neural network includes a high-band coefficient and a low-band coefficient of the previous frame, and a low-band coefficient of the current frame.

12. The decoder of claim 11, wherein the first neural network is configured to extract the parameter of the high band from a first input based on a per-frame spectrum of the audio.

13. The decoder of claim 12, wherein the first input is determined to be a subset of a spectrum, and the spectrum includes a high-band coefficient and a low-band coefficient of a previous frame, and a high-band coefficient and a low-band coefficient of a current frame.

14. The decoder of claim 11, wherein the second neural network is configured to extract the side information to restore the high band from a second input based on a per-frame spectrum of the audio.

* * * * *